(12) United States Patent
Vaccari (10) Patent No.: US 11,491,736 B2
(45) Date of Patent: Nov. 8, 2022

(54) MACHINE FOR WELDING PROFILED ELEMENTS

(71) Applicant: Graf Synergy S.r.l., Nonantola (IT)

(72) Inventor: Andrea Vaccari, Nonantola (IT)

(73) Assignee: Graf Synergy S.r.l., Nonantola (IT)

( * ) Notice: Subject to any disclaimer, the term of this patent is extended or adjusted under 35 U.S.C. 154(b) by 319 days.

(21) Appl. No.: 16/614,373

(22) PCT Filed: May 22, 2018

(86) PCT No.: PCT/IB2018/053618
§ 371 (c)(1),
(2) Date: Nov. 18, 2019

(87) PCT Pub. No.: WO2018/215934
PCT Pub. Date: Nov. 29, 2018

(65) Prior Publication Data
US 2020/0079032 A1 Mar. 12, 2020

(30) Foreign Application Priority Data
May 23, 2017 (IT) .................. 102017000056007

(51) Int. Cl.
*B29C 65/00* (2006.01)
*B32B 37/06* (2006.01)
(Continued)

(52) U.S. Cl.
CPC ...... *B29C 66/1162* (2013.01); *B29C 65/2069* (2013.01); *B29C 65/2092* (2013.01);
(Continued)

(58) Field of Classification Search
None
See application file for complete search history.

(56) References Cited

FOREIGN PATENT DOCUMENTS

| CA | 2464177 | 9/2005 |
|---|---|---|
| DE | 1926956 | 1/1970 |

(Continued)

OTHER PUBLICATIONS

International Search Report and the Written Opinion dated Sep. 3, 2018 From the International Searching Authority Re. Application No. PCT/IB2018/053618. (12 Pages).

*Primary Examiner* — Linda L Gray (57) ABSTRACT

The machine (1) for welding profiled elements comprises:
a base frame (2);
two retaining members (3, 4) of respective profiled elements (5) made at least partly of plastic and an area to be welded (6), the retaining members (3, 4) being mounted on the base frame (2) and defining a first retaining axis (A) and a second retaining axis (B) forming an angle of welding (7), and along which the profiled elements (5) can be fastened;
removal means (8) of material from the profiled elements (5) to make a machining on the area to be welded (6) of the profiled elements (5);
heat sealing means (9) mounted on the base frame (2) and adapted to weld the areas to be welded (6) of the profiled elements (5);
adjusting means (10) of the angle of welding (7) adapted to move at least one of the retaining members (3, 4) to incline at least one of the first retaining axis (A) and the second retaining axis (B) to change the angle of welding (7);
sliding means (11) of the retaining members (3, 4), mounted on the base frame (2) and adapted to move the retaining members (3, 4) in mutual approach or moving away without changing the angle of welding (7).

14 Claims, 9 Drawing Sheets

(51) Int. Cl.
   *B32B 38/04*   (2006.01)
   *B29C 65/20*   (2006.01)
   *B29C 65/78*   (2006.01)
   *B32B 37/00*   (2006.01)
   *B32B 38/00*   (2006.01)

(52) U.S. Cl.
   CPC .... *B29C 65/7802* (2013.01); *B29C 66/52431* (2013.01); *B29C 66/71* (2013.01); *B32B 37/0046* (2013.01); *B32B 37/06* (2013.01); *B32B 38/04* (2013.01); *B32B 38/105* (2013.01); *Y10T 156/108* (2015.01); *Y10T 156/1062* (2015.01); *Y10T 156/1064* (2015.01); *Y10T 156/1066* (2015.01); *Y10T 156/1082* (2015.01); *Y10T 156/125* (2015.01); *Y10T 156/1322* (2015.01); *Y10T 156/1744* (2015.01)

(56) References Cited

FOREIGN PATENT DOCUMENTS

| | | |
|---|---|---|
| DE | 3641019 | 6/1988 |
| DE | 4138501 | 7/1993 |
| DE | 10033225 | 1/2002 |
| DE | 202008008631 | 11/2009 |
| EP | 2070686 | 6/2009 |
| EP | 3117981 | 1/2017 |
| IT | MO20120200 | 2/2014 |
| IT | MO20120201 | 2/2014 |
| WO | WO 2014/122572 | 8/2014 |
| WO | WO 2017/009779 | 1/2017 |
| WO | WO 2018/215934 | 11/2018 |

MACHINE FOR WELDING PROFILED ELEMENTS

RELATED APPLICATIONS

This application is a National Phase of PCT Patent Application No. PCT/IB2018/053618 having International filing date of May 22, 2018, which claims the benefit of priority of Italian Patent Application No. 102017000056007 filed on May 23, 2017. The contents of the above applications are all incorporated by reference as if fully set forth herein in their entirety.

FIELD AND BACKGROUND OF THE INVENTION

The present invention relates to a machine for welding profiles elements.

In the state of the art, profiled elements are made entirely or even only partially of plastic such as PVC or the like, and are used to make windows and doors frames as well as various accessories of the frame itself such as small internal and external surrounds.

In the case in point, the profiled elements are welded together by melting their respective head surfaces in order to create various structures which differ in shape and size according to need.

In particular, melting takes place by heating the portions to be connected by means of appropriate electric heating plates and then pressing the heated portions the one against the other to favor the melting thereof. Generally, the heated portions are the head extremities of the profiled elements, suitably cut at 45° to define, for example, a right-angled portion of a respective window or door frame.

This method is carried out by welding machines equipped with respective profiled element retaining members, moving in mutual approach to bring the heated extremities to be welded into contact.

Other machines are also equipped with finishing systems which are adapted to remove the bead or welding bead which forms during the melting together of the two profiled elements.

In fact, at the line joining the two profiled elements surfaces cut at 45°, the portion of excess molten material comes out and forms a bead protruding from the visible surface of the profiled elements.

Hence, in order to give the finished door or window frame an appreciable aesthetic appearance, the profiled elements, once welded, undergo a bead removal process.

However, the known welding devices briefly described above have major drawbacks mainly linked to the formation of the aforementioned welding bead.

In fact, it must be considered that the welding area of the plastic profiled elements is not completely homogeneous and therefore, to make the profiled elements regular, a lot of material is melted with the consequent formation of an abundant bead, and therefore abundant waste material that has to be removed.

Furthermore, the finishing processes which are adapted to remove the bead and clean the welding area significantly impact the overall window or door frame machining time.

It should be noted in fact that, for each welding of the window or door frame, the profiled elements must be subsequently machined.

Furthermore, bead removal is considerably complicated for radial profiled elements.

To this must be added that the machines used for the aforementioned finishing operations are cumbersome, complex and particularly expensive.

This means that additional costs and processing times have to be incurred due to the presence of additional bulky tools and equipment.

Patent document WO 2013/132406 A1 shows a method and a device that allow to overcome the aforementioned drawbacks.

The system illustrated in WO 2013/132406 A1 is equipped with two mobile retaining members on which the profiled elements are mounted and allows them to be welded without forming any welding bead, thanks to a preventive milling operation of the areas to be welded, adapted to obtain a containment compartment for the welding bead on the profiled elements, and to the application of containment pressers, which are brought up to the heated profiled elements during welding and prevent the molten material from coming out of the containment compartment.

Furthermore, an improved type of pressing elements is shown in the patent document WO 2017/009779 A1.

More specifically, the document WO 2017/009779 A1 introduces the use of different containment pressers shaped so as to adapt and adhere to the profiled elements along the entire profile to be welded to contain the welding bead.

This way, the devices manufactured according to the indications of the patent document WO 2017/009779 A1 allow welding any type of profiled element on the market obtained from any extruder machine, in any part of the world and in any environmental and atmospheric conditions.

However, the device developed in accordance with the findings of the patent document WO 2017/009779 A1 could be improved with regard to the angle of welding of the profiled elements.

In fact, as mentioned above, known welding machines allow welding profiled elements only with a preset angle of welding which is generally 90° and permits making window or door frames with a substantially rectangular shape.

Moreover, the preliminary milling operations depend on the dimensions of the joining lines of the profiled elements to be welded, which in turn depend on the angle of welding at which the profiled elements are to be welded.

These drawbacks limit the production of window and door frames and frame accessories articulated in complex structures which require welding profiled elements with different angles of welding.

In fact, unlike the window and door frames of rectangular shape more commonly used, to make complex structures equipped with accessories, such as small external surrounds or internal shelves of various shapes and sizes, a specific machine is needed for each angle of welding used to weld the profiled elements together to form complex and articulated structures.

SUMMARY OF THE INVENTION

The main aim of the present invention is to provide a machine for welding profiled elements which allows welding any type of profiled elements on the market obtained from any extruder machine and with any angle of welding.

Another object of the present invention is to provide a machine for welding profiled elements which allows performing preliminary machining operations in the areas to be welded automatically for any angle of welding.

Last but not least object of the present invention is to provide a machine for welding profiled elements which greatly simplifies the entire welding process.

Another object of the present invention is to provide a machine for welding plastic profiled elements which allows overcoming the aforementioned drawbacks of the prior art within the scope of a simple, rational, easy, efficient to use and cost-effective solution.

The aforementioned objects are achieved by the present machine for welding profiled elements having the characteristics of claim 1.

BRIEF DESCRIPTION OF THE SEVERAL VIEWS OF THE DRAWINGS

Other characteristics and advantages of the present invention will become more evident from the description of a preferred, but not exclusive embodiment of a machine for welding profiled elements, illustrated by way of an indicative, but non-limiting example, in the attached drawings in which.

DESCRIPTION OF SPECIFIC EMBODIMENTS OF THE INVENTION

With particular reference to these figures, reference numeral 1 globally indicates a machine for welding profiled elements.

The machine 1 for welding profiled elements characterized by the fact that it comprises:
- at least one base frame 2;
- at least two retaining members 3, 4 of respective profiled elements 5 made at least partly of plastic and comprising at least one area to be welded 6, the retaining members 3, 4 being mounted on the base frame 2 and defining at least a first retaining axis A and at least a second retaining axis B forming an angle of welding 7, and along which the profiled elements 5 can be fastened;
- removal means 8 of material from the profiled elements 5 to make at least one machining on the area to be welded 6 of the profiled elements 5;
- heat sealing means 9 mounted on the base frame 2 and adapted to weld the areas to be welded 6 of the profiled elements 5;
- adjusting means 10 of the angle of welding 7 adapted to move at least one of the retaining members 3, 4 to incline at least one of the first retaining axis A and the second retaining axis B to change the angle of welding 7;
- sliding means 11 of the retaining members 3, 4, mounted on the base frame 2 and adapted to move the retaining members 3, 4 in mutual approach or moving away without changing the angle of welding 7.

Advantageously, the machine 1 is arranged resting on the ground by means of four supporting feet, and defines a horizontal worktop X and a vertical worktop Y.

Figure 1:
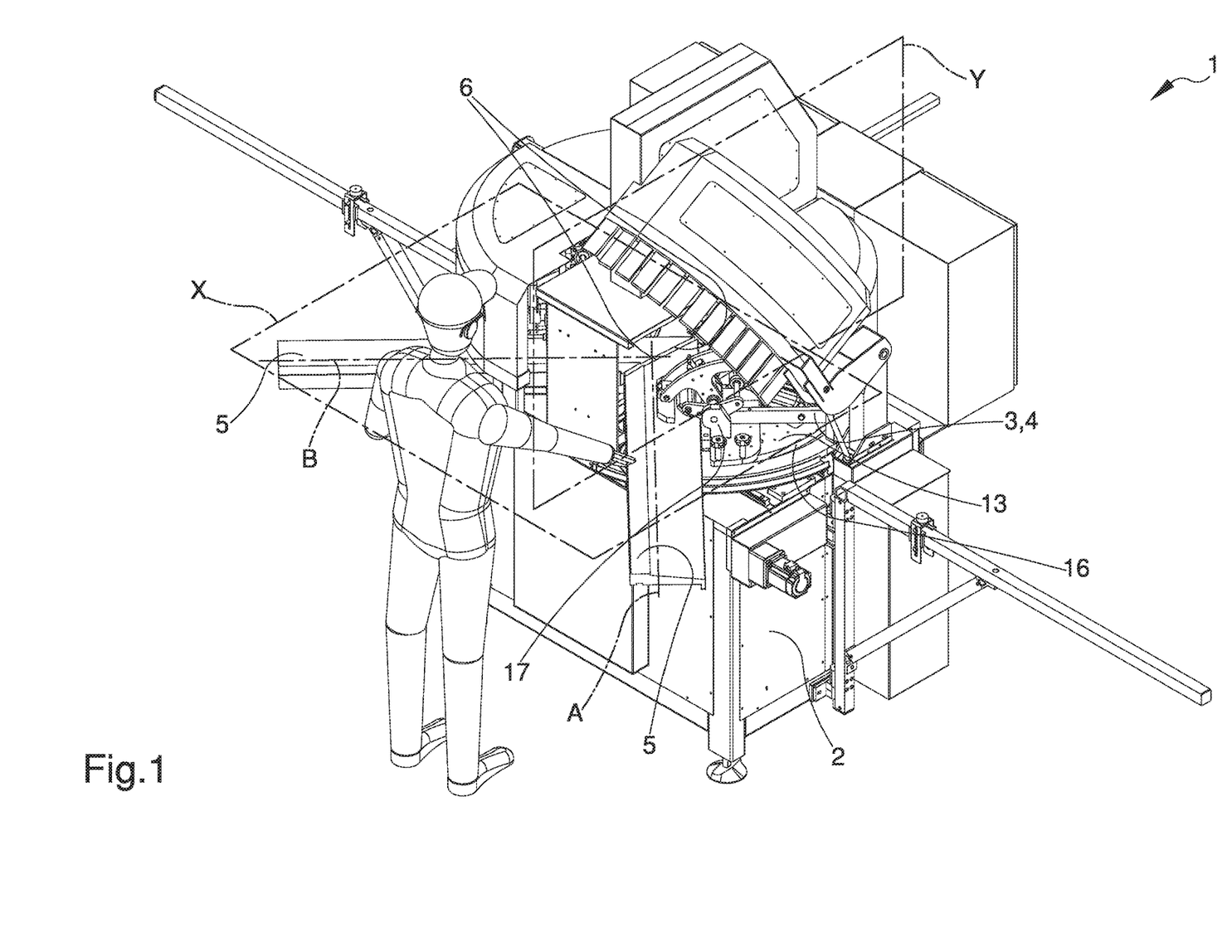
FIG. 1 is an axonometric view of the machine according to the invention.

Within the scope of the present treatise, the terms "horizontal" and "vertical" used with reference to the machine 1 refer to the conditions shown in FIG. 1, i.e. those in which the machine 1 appears arranged resting on the ground.

The horizontal worktop X is the plane on which the profiled elements 5 to be welded are arranged along the first retaining axis A and the second retaining axis B respectively.

Each profiled element 5 is fixed to the machine 1 on the horizontal worktop X by means of the corresponding retaining member 3, 4, in this case the machine 1 comprises two retaining members 3, 4 to weld two profiled elements 5 together.

The vertical worktop Y is the plane along which the areas to be welded 6 of the profiled elements 5 are welded.

More specifically, the vertical worktop Y is arranged equally spaced from the retaining members 3, 4.

Furthermore, the vertical worktop Y substantially coincides with the symmetry plane of the machine 1.

The sliding means 11 comprise:
- at least two backing planes 13 of the adjusting means 10; and
- at least two rectilinear guides 14 interposed between the backing planes 13 and the base frame 2, the backing planes 13 sliding in mutual approach or moving away on the rectilinear guides 14 along one direction of welding C.

More specifically, the rectilinear guide 14 comprises two rails substantially parallel to each other and arranged substantially parallel to the horizontal worktop X.

The backing planes 13 are arranged substantially parallel to the horizontal worktop X and coupled in a prismatic manner to the rectilinear guides 14.

Furthermore, the backing planes 13 are associated with the movement means for sliding on the corresponding rectilinear guides 14.

More specifically, each backing plane 13 is associated, by means of a threaded slot, with a corresponding worm screw arranged substantially parallel to the rails of the corresponding rectilinear guide 14 and interposed between the corresponding backing plane 13 and the movement means.

Figure 2:
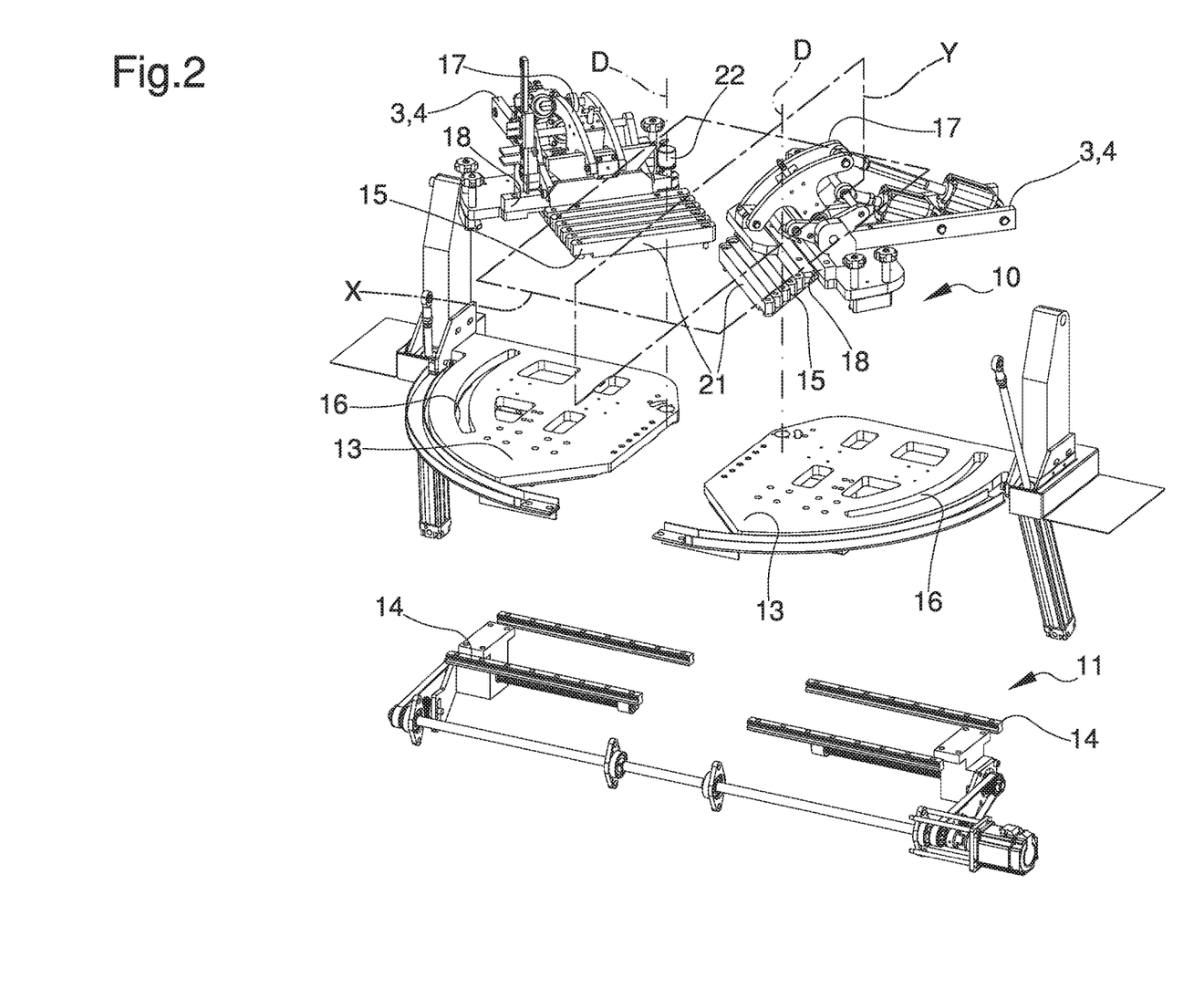
FIG. 2 is an exploded view of some components of the machine according to the invention.
Figure 3:
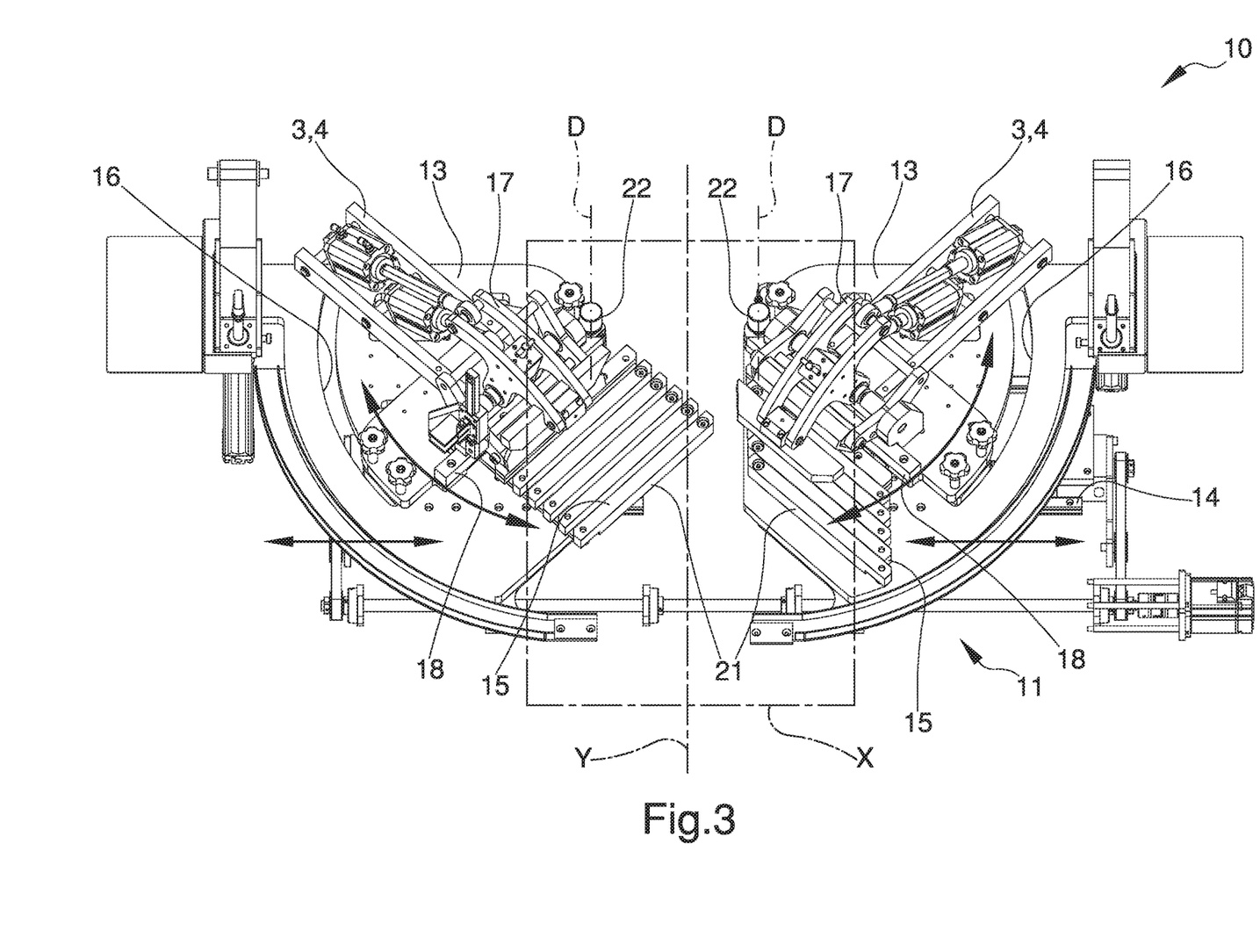
FIG. 3 is an axonometric view of some components of the machine according to the invention.

Advantageously, the movement means comprise a motor and a motion transmission unit associated with the motor for the transmission of the motion to the two worm screws at the same time as shown in FIG. 2.

Furthermore, the adjusting means 10 comprise:
- at least two holding planes 15 of the retaining members 3, 4 respectively and rotating around at least two adjusting axes D respectively, which are arranged substantially orthogonal to the backing planes 13; and
- at least two circular guides 16 interposed between the holding planes 15 and the backing planes 13 respectively, the holding planes 15 rotating in mutual approach or moving away around the adjusting axes D along the circular guides 16 to change the angle of welding 7.

The circular guide 16 is substantially a closed slot with curved shape and is obtained on the backing plane 13 to form an arc of circumference centered substantially on the adjusting axis D.

The holding plane 15 is essentially parallel to a backing plane 13 and to the horizontal worktop X and comprises an interlocking portion slotted inside the circular guide 16 to facilitate the rotation of the holding plane 15 on the backing plane 13.

More specifically, the holding plane 15 is hinged revolving to the backing plane 13 along an adjusting axis D.

The retaining members 3, 4 comprise at least a vice 17 adapted to face onto the corresponding profiled element 5 and fix it under pressure against the holding plane 15.

Furthermore, the retaining members 3, 4 comprise at least one rectilinear accommodation wall 18 of the profiled element 5 obtained in relief on the corresponding holding plane 15.

More specifically, each holding plane 15 is provided with a rectilinear accommodation wall 18 which defines the first retaining axis A and the second retaining axis B respectively.

Conveniently, the retaining members 3, 4 comprise an external vice and an internal vice with a flat stop surface, which are arranged raised with respect to the corresponding holding plane 15 and rotating around the same shaft of rotation.

This way, the external vice and the internal vice can face onto the corresponding profiled element 5 and lock it between the holding plane 15 and at least one of the stop surface of the external vice and the internal vice.

Advantageously, the external vice and the internal vice are arranged substantially parallel to each other and at a gradually greater distance with respect to the shaft of rotation to allow fixing profiled elements 5 of different sizes.

In fact, very thin profiled elements 5 can be fixed to the corresponding holding plane 15 along the corresponding rectilinear accommodation wall 18 only by means of the internal vice.

Each holding plane 15 comprises a number of movable flanges 21 arranged substantially parallel to each other to form a plane substantially parallel to the corresponding backing plane 13.

Advantageously, each movable flange 21 comprises a first extreme which is hinged revolving to the corresponding holding plane 15 and a second extreme which is hinged revolving to the corresponding backing plane 13.

This way, each movable flange 21 is able to move integral with the corresponding retaining member 3, 4 thus maintaining a planar structure in collaboration with the other movable flanges 21.

The adjusting means 10 comprise sensing means which are configured to detect the inclination of the first retaining axis A and of the second retaining axis B respectively, with respect to a reference position.

Advantageously, the sensing means are arranged in the proximity of the junction between the holding planes 15 and the backing planes 13.

The machine 1 according to one or more of the preceding claims, characterized by the fact that the adjusting means 10 comprise at least two encoders 22 associated with the holding planes 15 respectively, the encoders 22 being configured to operate in conjunction with the sensing means to detect the inclination of the first retaining axis A and of the second retaining axis B respectively, with respect to a reference position.

More specifically, the encoders 22 are connected to the sensing means to indicate the inclination of the first retaining axis A and of the second retaining axis B respectively, with respect to a reference position.

More specifically, the reference position is that where the angle of welding 7 between the first retaining axis A and the second retaining axis B is 180°.

It cannot be ruled out, however, that the reference position may be different, e.g., that where the angle of welding is 90°.

The removal means 8 comprise:
at least one movable structure 23 associated with the base frame 2 in the proximity of the retaining members 3, 4;
at least one working tool 26 for milling the area to be welded 6 of the profiled elements 5 and associated with the movable structure 23;
at least one longitudinal guide 24 interposed between the movable structure 23 and the base frame 2, the movable structure 23 sliding along the longitudinal guide 24 along a first direction of sliding E.

The longitudinal guide 24 comprises two rails substantially parallel to each other and arranged substantially parallel to the vertical worktop Y and to the horizontal sliding plane.

The movable structure 23 comprises a plate with a substantially rectangular shape arranged under the horizontal worktop X, substantially parallel to the vertical worktop Y and associated in a prismatic manner with the longitudinal guide 24.

More specifically, the longitudinal guide 24 defines the first direction of sliding E, substantially parallel to the vertical worktop Y and the horizontal worktop X.

Furthermore, the movable structure 23 is associated with the movement means for sliding on the longitudinal guide 24.

More specifically, the movable structure 23 is associated, by means of a threaded slot, with a worm screw arranged substantially parallel to the rails of the longitudinal guide 24 and interposed between the movable structure 23 and a motor means for the transmission of motion to the worm screw.

The working tool 26 comprises a milling unit 27 arranged substantially orthogonal to the vertical worktop Y for machining the profiled element 5.

Furthermore, the working tool 26 comprises at least one cleaning body 28 for the collection of residual material from the machining of the profiled element 5.

Advantageously, the working tool 26 comprises a plurality of cleaning bodies 28 made of elastic material and arranged radially around the milling unit 27 to cover it almost entirely.

The machine 1 according to claim 6, characterized by the fact that the movable structure 23 comprises:
at least one auxiliary movable structure 29 associated with the working tool 26;
at least one auxiliary longitudinal guide 30 substantially orthogonal with respect to the longitudinal guide 24 interposed between the auxiliary movable structure 29 and the movable structure 23, the auxiliary movable structure 29 sliding along the auxiliary longitudinal guide 30 along a second direction of sliding F substantially orthogonal to the first direction of sliding E.

The auxiliary longitudinal guide 30 comprises two rails substantially parallel to each other and arranged substantially parallel to the vertical worktop Y and substantially orthogonal to the horizontal worktop X.

Furthermore, the auxiliary longitudinal guide 30 is associated with the plate substantially opposed to the longitudinal guide 24.

The auxiliary movable structure 29 is a sheet with a substantially rectangular shape arranged below the horizontal worktop X, substantially parallel to the vertical worktop Y and associated in a prismatic manner with the auxiliary longitudinal guide 30.

More specifically, the auxiliary longitudinal guide 30 defines the second direction of sliding F, substantially parallel to the vertical worktop Y and substantially orthogonal to the horizontal worktop X and to the first direction of sliding E.

Furthermore, the auxiliary movable structure 29 is associated with movement means for sliding on the auxiliary longitudinal guide 30.

More specifically, the auxiliary movable structure 29 is associated, by means of a threaded slot, with a worm screw arranged substantially parallel to the rails of the auxiliary longitudinal guide 30 and interposed between the auxiliary movable structure 29 and a motor means for the transmission of motion to the worm screw.

To sum up, the working tool 26 is moved freely along the longitudinal guide 24 and the auxiliary longitudinal guide 30; this way, the working tool 26 is free to explore all the points of the plane defined by the first direction of sliding E and the second direction of sliding F.

The removal means 8 comprise one pair of working tools 26 positioned opposed to each other to mill the area to be welded 6 of two profiled elements 5 at the same time and perform the machining operation.

More specifically, the removal means 8 also comprise a containment support of the working tools 26.

Figure 5:
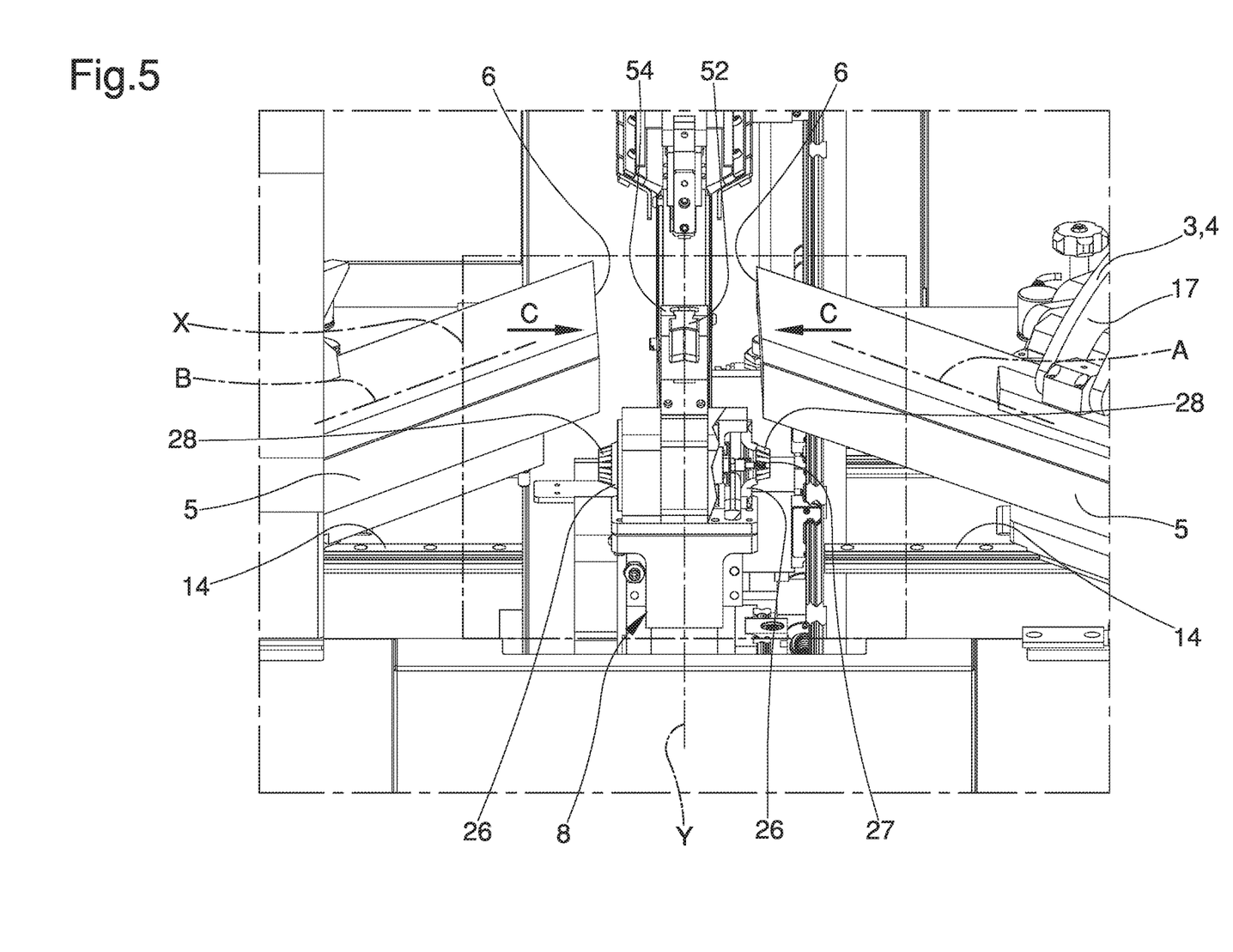
FIG. 5 is an axonometric view of a portion of the machine according to the invention.
Figure 6:
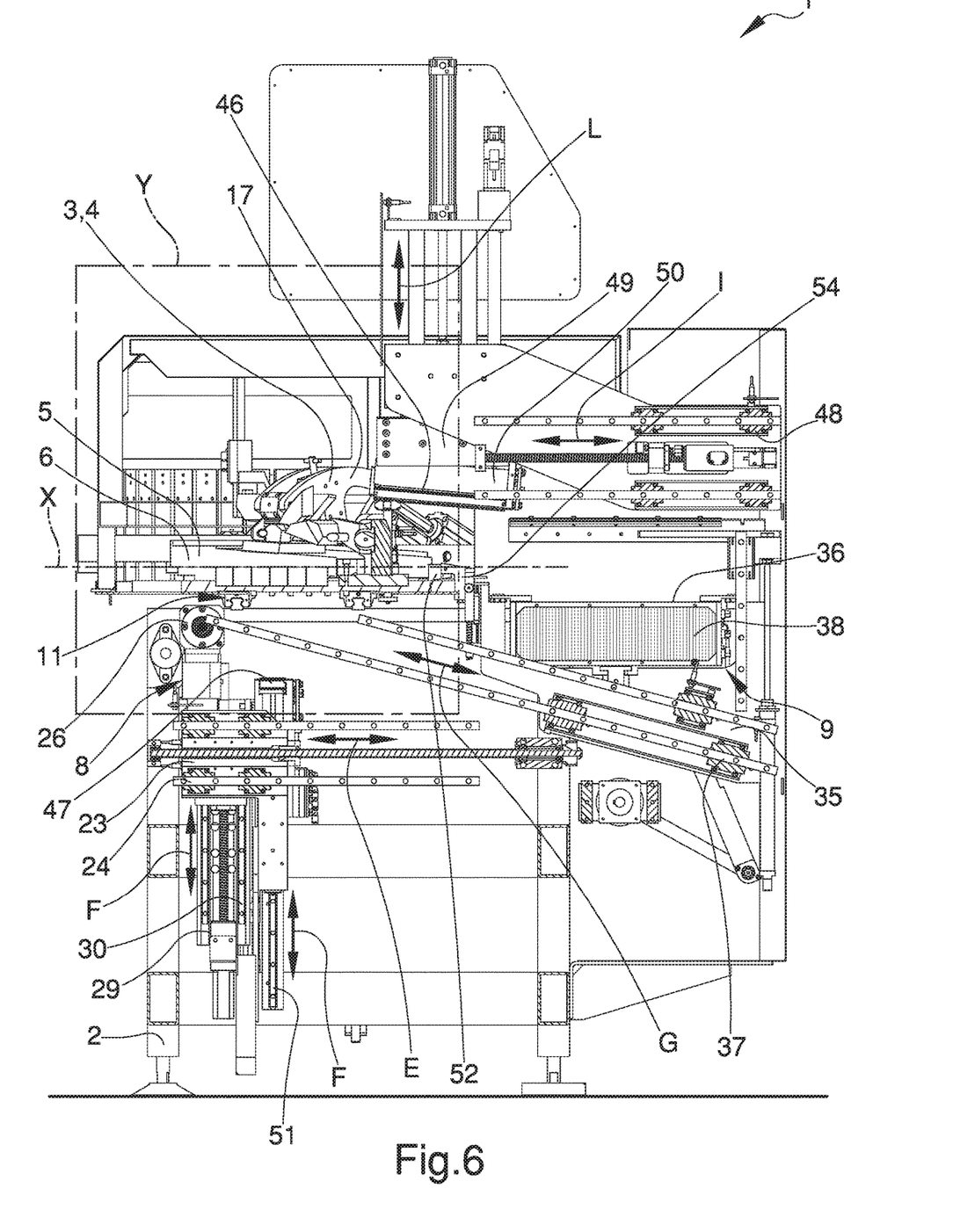
FIG. 6 is a sectional view of the machine according to the invention.

The containment support is associated with the upper extremity of the auxiliary movable structure 30 and the working tools 26 are mounted on the containment support substantially opposite one another and substantially symmetrical with respect to the vertical worktop Y as shown in FIG. 5.

The machine 1 according to one or more of the preceding claims, characterized by the fact that it comprises at least one calculating unit configured to calculate the machining path 32 of the working tool 26 to perform a machining operation on the area to be welded 6, the machining path 32 being calculated according to the value of the angle of welding 7.

More specifically, the calculating unit is configured to calculate the machining path 32 starting from a reference path 33 corresponding to a predefined angle of welding 34, the machining path 32 being calculated automatically upon varying the angle of welding 7 with respect to the predefined angle of welding 34.

In the remainder of this treatise, a value of 180° is considered as the value of the predefined angle of welding 34, in this case such value is the value of the angle of welding 7 so that the two profiled elements 5 are welded without forming any edge between them.

More specifically, to obtain a welding of this type, the profiled elements 5 to be welded must be cut transversely at 90°.

In other words, the longitudinal cross-section of the profiled elements 5 must be substantially rectangular in shape.

Figure 4:
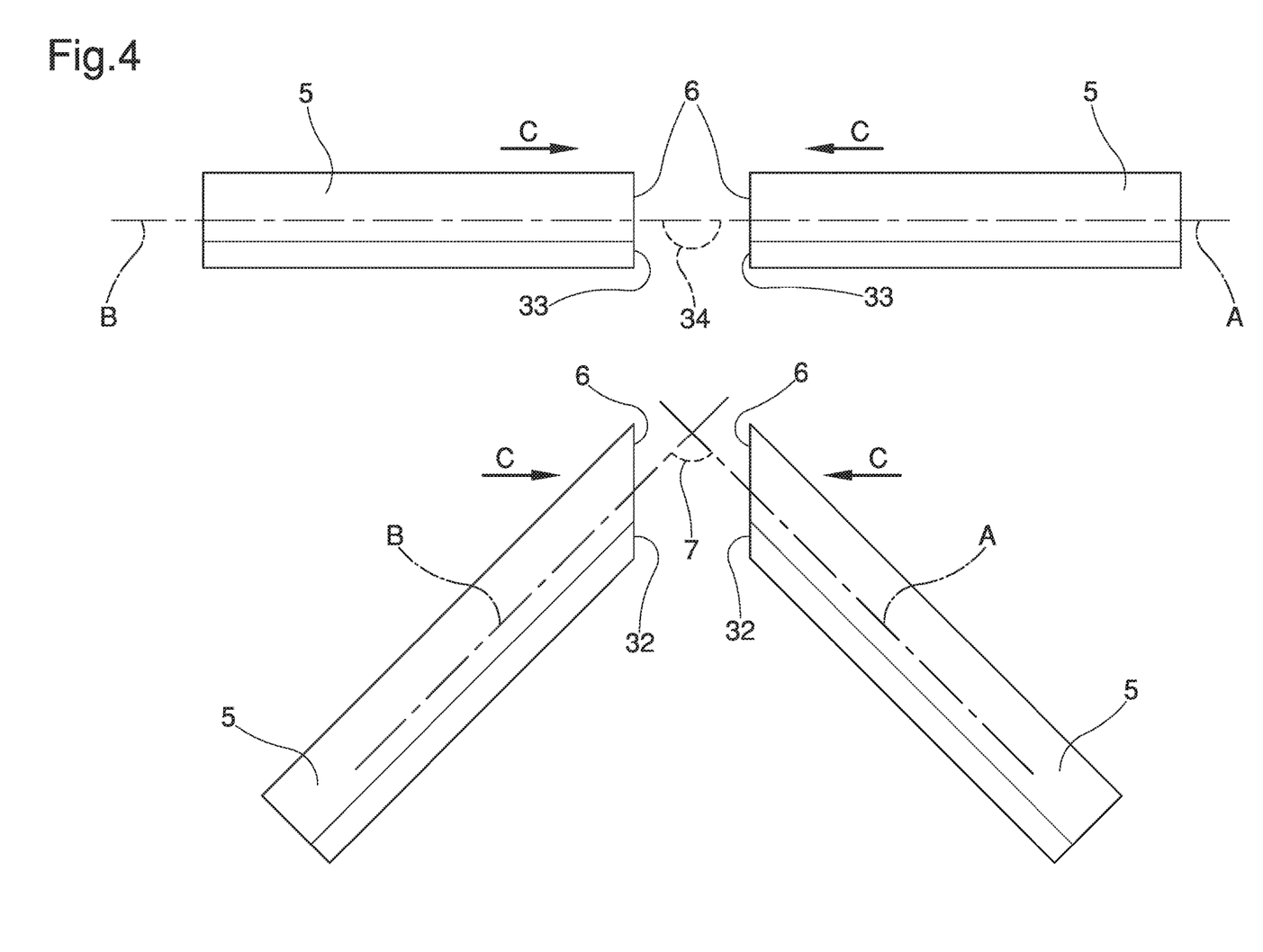
FIG. 4 is a view of the profiled elements to be welded with the machine according to the invention.

Under these assumptions, it is therefore possible to define a reference path 33 which coincides with the width of the profiled element 5, as shown in FIG. 4.

This way, depending on the desired angle of welding 7, the calculation unit automatically calculates the machining path 32.

More specifically, the value of the reference path 33 and of the predefined angle of welding 34 are assigned as input data to the calculation unit to calculate the machining path 32.

Having defined such input values, an operator must set the angle of welding 7 with which to weld the profiled elements 5.

Depending on the angle of welding 7 set, the calculation unit calculates the machining path 32, e.g., using the following formula:

$$P_{sal} = \frac{P_{rif}}{\cos\left[\frac{\alpha_{rif} - \alpha_{sal}}{2}\right]}$$

wherein $P_{rif}$ is the value of the reference path 33, $\alpha_{rif}$ is the value of the predefined angle of welding 34, $\alpha_{sal}$ is the value of the angle of welding 7 required between the profiled elements 5 and $P_{sal}$ is the value of the machining path 32.

In particular, the value of the machining path 32 coincides with the distance which the working tool 26 has to cover along the first direction of sliding E to work all the area to be welded 6 of both the profiled elements 5.

In the specific case just described, if we assume the value of $P_{rif}$=50 centimeters, the value of $\alpha_{rif}$=180° and an angle of welding 7 is required equal to $\alpha_{sal}$=90° the result is $P_{sal}$=70.7 centimeters.

The formula just used and the calculations deriving from it are expressed purely as an example, and in fact alternative forms of calculation of the machining path 32 of the working tool 26 to prepare profiled elements 5 to be welded cannot be ruled out.

Furthermore, the calculation unit is connected to the encoders 22 with which it shares the angle of welding 7 set by the operator.

This way, the encoders 22 make sure the value of the angle formed between the first retaining axis A and the second retaining axis B is equal to the value of the angle of welding 7.

The heat sealing means 9 comprise:
  at least one movable backing body 35 associated with the base frame 2 in the proximity of the retaining members 3, 4;
  at least one heat sealing plate 36 associated with the movable backing body 35;
  at least one straight guide 37 interposed between the movable backing body 35 and the base frame 2, the movable backing body 35 sliding along the straight guide 37 and moving the heat sealing plate 36 between:
    at least one work configuration in which the heat sealing plate 36 is interposed between the areas to be welded 6 of the profiled elements 5; and
    at least one home configuration in which the heat sealing plate 36 is retracted to free the space interposed between the areas to be welded 6 of the profiled elements 5.

The straight guide 37 comprises two rails substantially parallel to each other and arranged substantially parallel to the vertical worktop Y.

The movable backing body 35 is a substantially plate-shaped body associated in a prismatic manner with the straight guide 37.

Furthermore, the movable backing body 35 lies on the vertical worktop Y and comprises an interlocking compartment which houses the heat sealing plate 36, also arranged on the vertical worktop Y.

The heat sealing plate 36 has a substantially rectangular shape, comprises two parallel and opposite work faces 38 and at least one heating element, e.g., an electric heating element, to heat the work faces 38.

Furthermore, the movable backing body 35 is associated with movement means for sliding along the straight guide 37.

More specifically, the straight guide 37 is inclined and is arranged under the horizontal worktop X to allow the movement of the heat sealing plate 36 along a work direction G between the work configuration and the idle configuration.

In fact, in the work configuration the heat sealing plate 36 through the horizontal worktop X and is arranged substantially transversal to the direction of welding C, while in the idle configuration the heat sealing plate 36 is arranged below the horizontal worktop X.

The machine 1 also comprises containment means 39, which are mounted in a movable manner on the base frame 2 and are adapted to rest at least partly on the profiled elements 5 in the proximity of the areas to be welded 6 to contain at least one welding bead 40.

The containment means 39 comprise at least one lateral containment presser 41 provided with at least one stop face 42 defining together with the profiled elements 5 a lateral containment surface 43 of the welding bead 40.

Furthermore, the lateral containment presser 41 comprises a plurality of stop faces 42 and rotates on itself to arrange selectively and alternatively the stop faces 42 towards the profiled elements 5.

More specifically, the lateral containment presser 41 is a longitudinal bar with a substantially square section and rotating around at least one rotation axis H lying on the vertical worktop Y.

Figure 8:
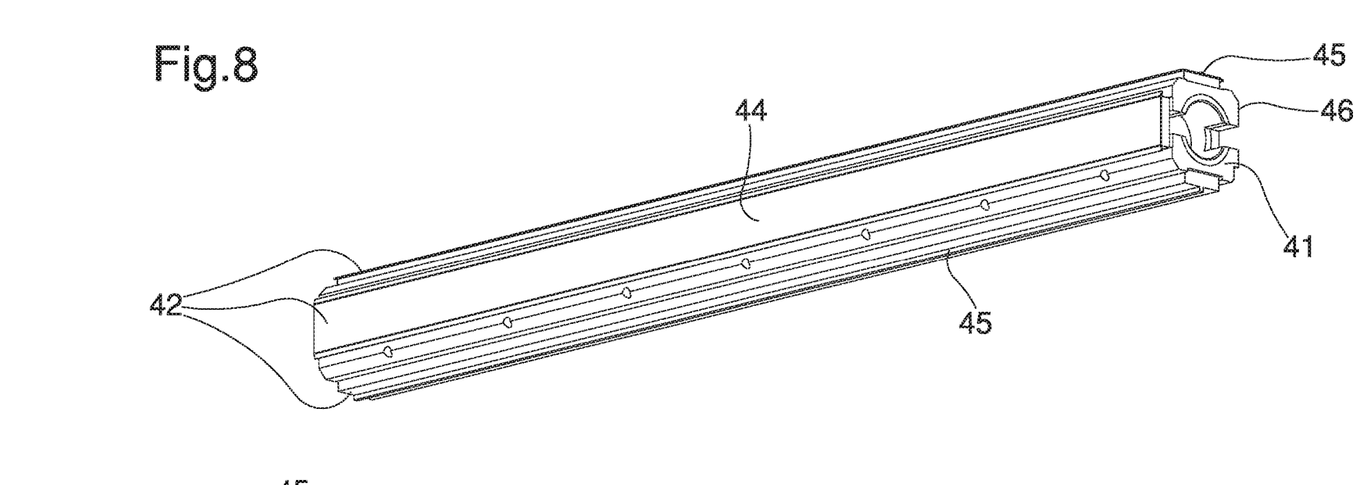
FIG. 8 is an axonometric view of a component of the machine according to the invention.
Figure 9:
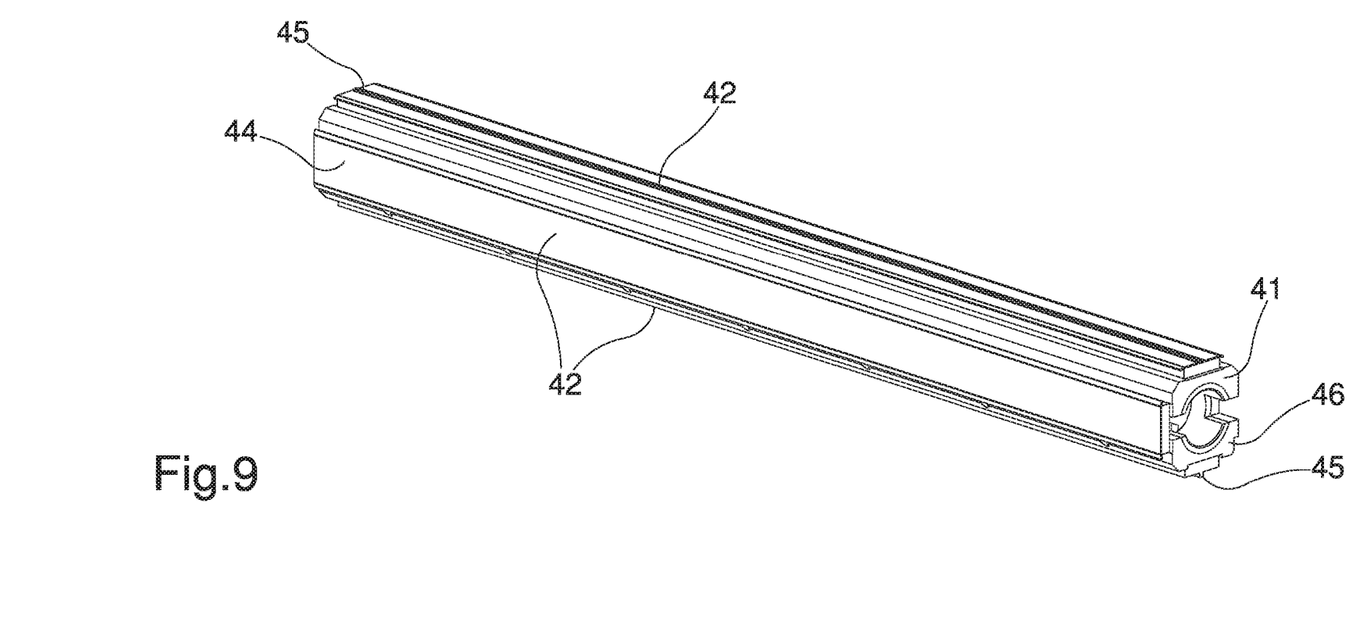
FIG. 9 is another axonometric view of the component shown in FIG. 8.
Figure 10:
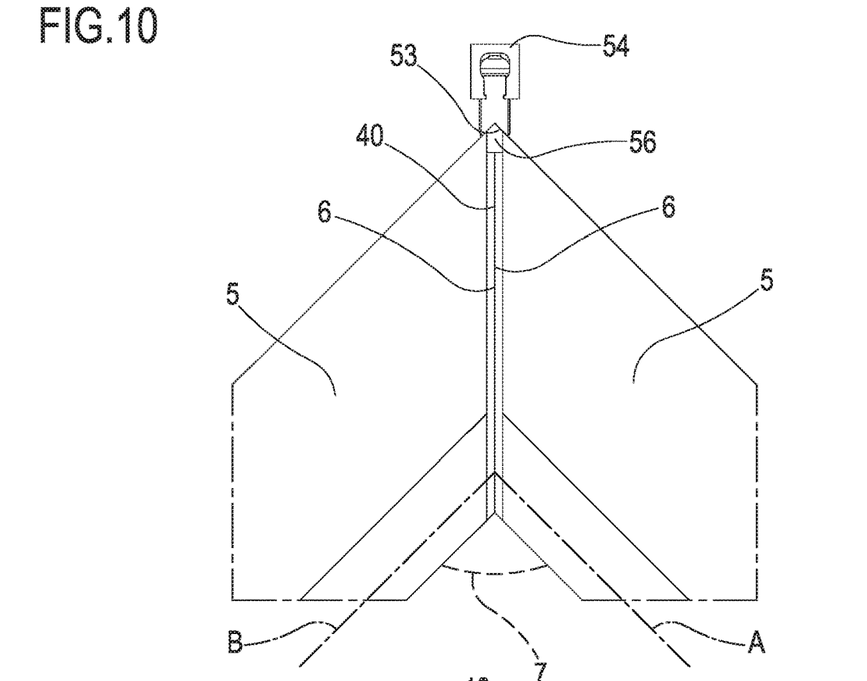
FIG. 10 is a top view of some components of the machine according to the invention.
Figure 11:
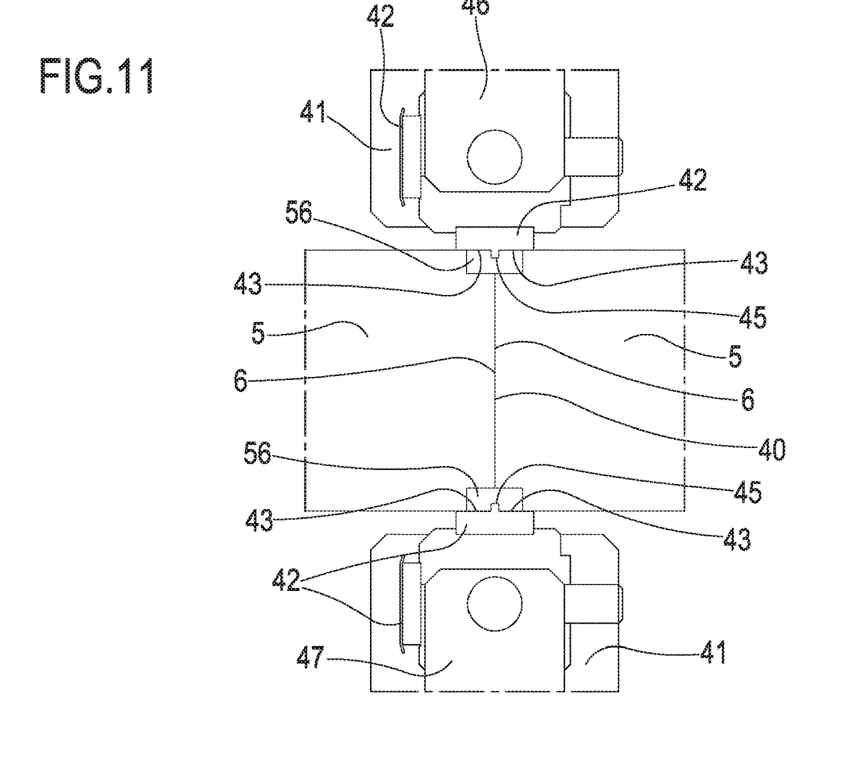
FIG. 11 is a front view of some components of the machine according to the invention.

With particular reference to FIG. 8 and to FIG. 9, the lateral containment presser 41 comprises three stop faces 42.

One of the stop faces 42 comprises a flat surface 44, while the other two comprise a longitudinal protrusion 45, one larger than the other respectively.

Alternative embodiments cannot however be ruled out wherein the lateral containment presser 41 is made in a different shape, comprises a higher number of stop faces 42 and/or in which the stop faces 42 comprise more than one longitudinal protrusion 45.

Advantageously, the containment means 39 comprise an upper lateral containment presser 46 and a lower lateral containment presser 47 lying on the vertical worktop Y substantially parallel and opposite each other and to the horizontal worktop X.

More specifically, the upper lateral containment presser 46 is arranged above the horizontal worktop X, while the lower lateral containment presser 47 is arranged below the horizontal worktop X.

The upper lateral containment presser 46 is associated with the base frame 2 through longitudinal sliding means 48 sliding along a first direction of displacement I substantially parallel to the first direction of sliding E of the working tool 26.

The longitudinal sliding means 48 comprise a sliding assembly 49 of the upper lateral containment presser 46 along a second direction of displacement L substantially orthogonal to the first direction of displacement I.

The upper lateral containment presser 46 is associated with an inclinable support 50 on which it is free to rotate around a rotation axis H lying on the vertical worktop Y.

The inclinable support 50 comprises a first extreme which is hinged revolving to the sliding assembly 49 to allow the inclination of the upper lateral containment presser 46 along the vertical worktop Y and a second free extreme which is arranged substantially opposite the first extreme.

Furthermore, the longitudinal sliding means 48 comprise an elastic element interposed between the sliding assembly 49 and the inclinable support 50.

More specifically, the elastic element is associated with the inclinable support 50 at a substantially intermediate distance between the first extreme and the second extreme.

Furthermore, the sliding assembly 49 comprises a motorized pressure element which is adapted to push the second extreme of the inclinable support 50 so as to press the upper lateral containment presser 46.

This way, the inclinable support 50 enables the upper lateral containment presser 46 to set itself in pressure and in a uniform way with the profiled elements 5, also adapting themselves to inclined surfaces.

Advantageously, similarly to the working tool 26, the lower lateral containment presser 47 is associated with the movable structure 23 of the removal means 8 by means of a lower operating guide 51 substantially parallel to the auxiliary longitudinal guide 30.

This way, the lower lateral containment presser 47 can be moved along the first direction of sliding E and the second direction of sliding F.

The containment means 39 comprise at least one front containment presser 52 having two sides arranged in a "V" pattern and defining with the profiled elements 5 a front containment surface 53 of the welding bead 40.

The front containment presser 52 is associable, through a backing fork 54, with the movable backing body 35 of the heat sealing means 9.

The containment means 39 also comprise a dampening element 55 interposed between the backing fork 54 and the movable backing body 35 of the heat sealing means 9.

More specifically, the front containment presser 52 is facing with the concavity formed by the V-shaped sides towards the retaining members 3, 4.

In the particular embodiment shown in the illustrations, the front containment presser 52 is made of a monolithic body, but alternative embodiments cannot be ruled out wherein the front containment presser 52 comprises a plurality of V-shaped elements, as shown in the patent document WO 2017/009779 A1.

The machine 1 according to one or more of the preceding claims, characterized by the fact that the removal means 8 are adapted to form at least one groove on the areas to be welded 6 of the profiled elements 5, the front containment presser 52 and the lateral containment presser 41 defining in conjunction with the groove a containment compartment 56 of the welding bead 40.

The operation of the machine 1 is as follows.

Two profiled elements 5 are arranged on the holding planes 15 and oriented along the first retaining axis A and the second retaining axis B respectively by the corresponding rectilinear accommodation walls 18.

Positioned in this way, the profiled elements 5 are fixed to the retaining members 3, 4 by means of the vices 17.

More specifically, the profiled elements 5 are arranged substantially "mirrored" so as to be spaced by the same distance as the vertical worktop Y.

In the rest of the treatise, we consider that the two profiled elements 5 were previously cut at 45° to be welded with an angle of welding 7 of 90°.

These considerations are valid merely as an example, in fact, the same profiled elements 5 could be cut, e.g., at 30° to be welded with an angle of welding 7 of 60°.

The holding planes 15 are rotated by means of the circular guides 16 around the corresponding adjusting axes D to adjust the angle of welding 7.

More specifically, the holding planes 15 are rotated manually by an operator.

Alternative embodiments cannot however be ruled out wherein the rotation of the holding planes 15 starts automatically, e.g. by means of an electric actuator.

During the rotation of the holding planes 15 the sensing means communicate to the encoder the angular position of the same holding plane 15 with respect to the reference position, which by way of example is that corresponding to an angle of welding 7 equal to 180°.

The encoders 22 convert the angular position into a digital datum which is transmitted to the calculation unit.

The calculation unit compares the angular position with the value of the angle of welding entered by the operator and informs the encoders 22 if the two values are the same.

This way, the encoders 22 inform the operator, who is rotating the holding planes 15, when the set angle of welding 7 is reached.

Once the angle of welding 7 has been reached, the areas to be welded 6 of the profiled elements 5 are arranged facing each other along the direction of welding C.

The backing planes 13 are moved to slide towards each other along the corresponding rectilinear guides 14 in order to bring the areas to be welded 6 closer to be machined.

More specifically, the distance at which the areas to be welded 6 are arranged is substantially the same as the distance between the milling units 27 of the corresponding working tools 26.

This way, the working tools 26 are automatically moved along the first direction of sliding E and the second direction of sliding F to work the areas to be welded 6 of the profiled elements 5 simultaneously and in a mirrored way.

As mentioned above, the calculation unit calculates the machining path 32 to be covered by the working tools 26.

More specifically, the machining path 32 coincides with the displacement of the working tools 26 along the longitudinal guide 24.

The machining process consists in leveling out the areas to be welded 6, reducing the imperfections arising from the extrusion operations of the profiled elements.

This way, the welding of the areas to be welded 6 requires the melting of less material with a consequent reduction in the welding bead 40.

Alternative ways of machining the areas to be welded 6 cannot however be ruled out, e.g. wherein more complex grooves or machining operations are carried out.

Once machining is complete, the working tools 26 retract along the second direction of sliding F and arrange themselves below the horizontal worktop X, while the heat sealing plate 36 is automatically moved along the work direction G.

More specifically, the heat sealing plate is heated by the electrical heating elements and is moved from the idle configuration to the work configuration.

In this configuration, the backing planes 13 slide along the rectilinear guides 14 to bring the areas to be welded 6 into contact with the corresponding work faces 38 of the heat sealing plate 36.

After the areas to be welded 6 are partially melted, the sliding means 11 move the profiled elements 5 away to enable the heat sealing plate 36 to be moved from the work configuration to the idle configuration.

This way, the areas to be welded 6 are mutually put under pressure by the sliding means 11.

Figure 7:
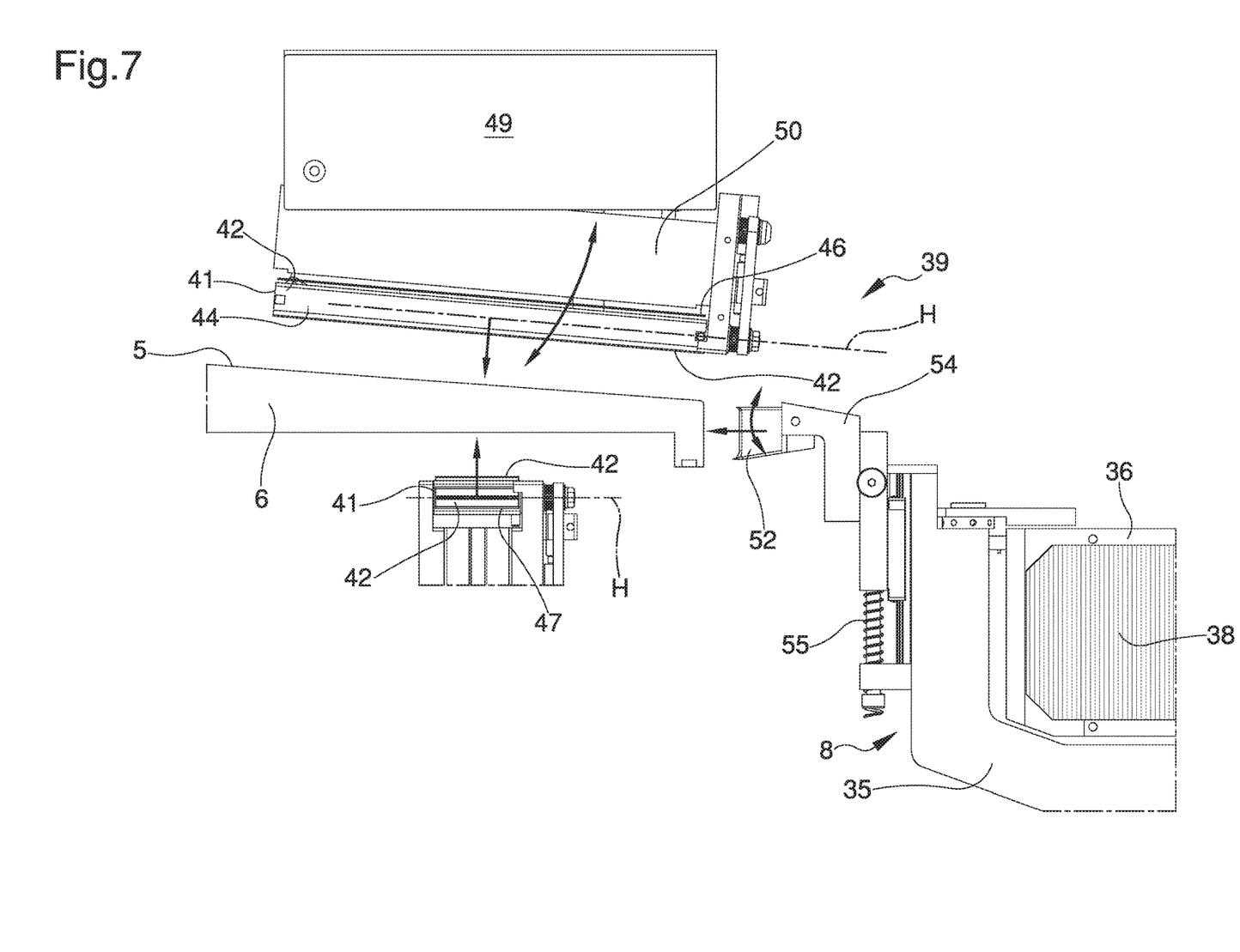
FIG. 7 is a sectional view of some components of the machine according to the invention.

At the same time, the containment means 39 are automatically activated to bring the upper lateral containment presser 46, the lower lateral containment presser 47 and the front containment presser 52 into contact with the profiled elements 5 at the junction between the areas to be welded 6 as shown in FIG. 7.

More specifically, the upper lateral containment presser 46 moves along the first direction of displacement I and the second direction of displacement L, the lower lateral containment presser 47 moves along the first direction of sliding E and the second direction of sliding F and the front containment presser 52 moves along the work direction G.

This way, the profiled elements 5 are welded together without forming any welding bead 40.

It has in practice been ascertained that the described invention achieves the intended objects.

What is claimed is:

1. Machine (1) for welding profiled elements, wherein said machine (1) comprises:
    at least one base frame (2);
    at least two retaining members (3, 4) of respective profiled elements (5) made at least partly of plastic and comprising at least one area to be welded (6), said retaining members (3, 4) being mounted on said base frame (2) and defining at least a first retaining axis (A) and at least a second retaining axis (B) forming an angle of welding (7), and along which said profiled elements (5) can be fastened;
    removal means (8) of material from said profiled elements (5) to make at least one machining on said at least one area to be welded (6) of said profiled elements (5);
    heat sealing means (9) mounted on said base frame (2) and adapted to weld said at least one area to be welded (6) of said profiled elements (5);
    adjusting means (10) of said angle of welding (7) adapted to move at least one of said retaining members (3, 4) to incline at least one of said first retaining axis (A) and said second retaining axis (B) to change said angle of welding (7);
    sliding means (11) of said retaining members (3, 4), mounted on said base frame (2) and adapted to move said retaining members (3, 4) in mutual approach or moving away without changing said angle of welding (7);
    wherein said sliding means (11) comprises
    at least two backing planes (13); and
    at least two rectilinear guides (14) interposed between said backing planes (13) and said base frame (2), said backing planes (13) sliding in mutual approach or moving away on said rectilinear guides (14) along one direction of welding (C);
    wherein said adjusting means (10) comprises:
    at least two holding planes (15) of said retaining members (3, 4) respectively and rotating around at least two adjusting axes (D) respectively, which are arranged substantially orthogonal to said backing planes (13); and
    wherein:
    said adjusting means (10) is configured to detect the inclination of said first retaining axis (A) and of said second retaining axis (B) respectively, with respect to a reference position;
    and
    said adjusting means (10) comprise at least two encoders (22) associated with said holding planes (15) respectively, said encoders (22) being configured to detect the inclination of said first retaining axis (A) and of said second retaining axis (B) respectively, with respect to the reference position.

2. Machine (1) according to claim 1, wherein said adjusting means (10) comprise sensing means configured to detect the inclination of said first retaining axis (A) and of said second retaining axis (B) respectively, with respect to a reference position.

3. Machine (1) according to claim 1, wherein said removal means (8) comprise:
at least one movable structure (23) associated with said base frame (2) in a proximity of said retaining members (3, 4);
at least one working tool (26) for milling said at least one area to be welded (6) of said profiled elements (5) and associated with said at least one movable structure (23);
at least one longitudinal guide (24) interposed between said at least one movable structure (23) and said base frame (2), said at least one movable structure (23) sliding along said longitudinal guide (24) along a first direction of sliding (E).

4. Machine (1) according to claim 3, wherein said at least one movable structure (23) comprises:
at least one auxiliary movable structure (29) associated with said at least one working tool (26);
at least one auxiliary longitudinal guide (30) interposed between said auxiliary movable structure (29) and said at least one movable structure (23), said auxiliary movable structure (29) sliding along said auxiliary longitudinal guide (30) along a second direction of sliding (F) substantially orthogonal to said first direction of sliding (E);
wherein said at least one auxiliary longitudinal guide (30) is substantially orthogonal with respect to said longitudinal guide (24).

5. Machine (1) according to claim 3, wherein said removal means (8) comprise one pair of said working tools (26) positioned opposed to each other to mill said area to be welded (6) of two profiled elements (5) at the same time and perform said at least one machining.

6. Machine (1) according to claim 3, wherein said machine (1) comprises at least one calculating unit configured to calculate a machining path (32) of said working tool (26) to perform said at least one machining on said area to be welded (6), said machining path (32) being calculated according to the value of said angle of welding (7).

7. Machine (1) according to claim 6, wherein said calculating unit is configured to calculate said machining path (32) starting from a reference path (33) corresponding to a predefined angle of welding (34), said machining path (32) being calculated automatically upon varying said angle of welding (7) with respect to said predefined angle of welding (34).

8. Machine (1) according to claim 1, wherein said heat sealing means (9) comprise:
at least one movable backing body (35) associated with said base frame (2) in a proximity of said retaining members (3, 4);
at least one heat sealing plate (36) associated with said movable backing body (35);
at least one straight guide (37) interposed between said movable backing body (35) and said base frame (2), said movable backing body (35) sliding along said straight guide (37) and moving said heat sealing plate (36) between:

at least one work configuration in which said heat sealing plate (36) is interposed between said at least one area to be welded (6) of said profiled elements (5); and
at least one home configuration in which said heat sealing plate (36) is retracted to free the space interposed between said at least one area to be welded (6) of said profiled elements (5).

9. Machine (1) for welding profiled elements, wherein said machine (1) comprises:
at least one base frame (2);
at least two retaining members (3, 4) of respective profiled elements (5) made at least partly of plastic and comprising at least one area to be welded (6), said retaining members (3, 4) being mounted on said base frame (2) and defining at least a first retaining axis (A) and at least a second retaining axis (B) forming an angle of welding (7), and along which said profiled elements (5) can be fastened;
removal means (8) of material from said profiled elements (5) to make at least one machining on said at least one area to be welded (6) of said profiled elements (5);
heat sealing means (9) mounted on said base frame (2) and adapted to weld said at least one area to be welded (6) of said profiled elements (5);
adjusting means (10) of said angle of welding (7) adapted to move at least one of said retaining members (3, 4) to incline at least one of said first retaining axis (A) and said second retaining axis (B) to change said angle of welding (7);
sliding means (11) of said retaining members (3, 4), mounted on said base frame (2) and adapted to move said retaining members (3, 4) in mutual approach or moving away without changing said angle of welding (7);
wherein said machine (1) comprises containment means (39), which are mounted in a movable manner on said base frame (2) and are adapted to rest at least partly on said profiled elements (5) in the proximity of said at least one area to be welded (6) to contain at least one welding bead (40).

10. Machine (1) according to claim 9, wherein said containment means (39) comprise at least one lateral containment presser (41) provided with at least one stop face (42) defining together with said profiled elements (5) a lateral containment surface (43) of said welding bead (40).

11. Machine (1) according to claim 10, wherein said lateral containment presser (41) comprises a plurality of said stop faces (42) and rotates on itself to arrange selectively and alternatively said stop faces (42) towards said profiled elements (5).

12. Machine (1) according to claim 9, wherein said containment means (39) comprise at least one front containment presser (52) having two sides arranged in a "V" pattern and defining with said profiled elements (5) a front containment surface (53) of said welding bead (40).

13. Machine (1) according to claim 10, wherein said removal means (8) are adapted to form at least one groove on said at least one area to be welded (6) of said profiled elements (5), said lateral containment presser (41) defining in conjunction with said groove a containment compartment (56) of said welding bead (40).

14. Machine (1) according to claim 12, wherein said removal means (8) are adapted to form at least one groove on said at least one area to be welded (6) of said profiled elements (5), said front containment presser (52) defining in conjunction with said groove a containment compartment (56) of said welding bead (40).

\* \* \* \* \*